(12) United States Patent
Limaye et al.

(10) Patent No.: US 12,353,570 B1
(45) Date of Patent: Jul. 8, 2025

(54) SIDE-CHANNEL RESILIENT PUBLIC KEY CRYPTOGRAPHY

(71) Applicant: Synopsys, Inc., Sunnyvale, CA (US)

(72) Inventors: Nimisha Limaye, Jersey City, NJ (US); Michael Kenneth Bowler, Ottawa (CA)

(73) Assignee: SYNOPSYS, INC., Sunnyvale, CA (US)

( * ) Notice: Subject to any disclaimer, the term of this patent is extended or adjusted under 35 U.S.C. 154(b) by 264 days.

(21) Appl. No.: 18/215,657

(22) Filed: Jun. 28, 2023

(51) Int. Cl.
  *G06F 21/60* (2013.01)
  *G06F 17/16* (2006.01)
  *G06F 21/72* (2013.01)

(52) U.S. Cl.
  CPC ............ *G06F 21/602* (2013.01); *G06F 17/16* (2013.01); *G06F 21/72* (2013.01)

(58) Field of Classification Search
  CPC ......... G06F 21/602; G06F 17/16; G06F 21/72
  See application file for complete search history.

(56) References Cited

U.S. PATENT DOCUMENTS

| | | | | |
|---|---|---|---|---|
| 6,684,330 B1 * | 1/2004 | Wack | ...................... | H04L 9/085 380/278 |
| 6,769,062 B1 * | 7/2004 | Smeets | ...................... | H04L 9/08 713/193 |
| 10,110,375 B2 * | 10/2018 | Ma | ........................... | H04L 9/003 |
| 2008/0240443 A1 * | 10/2008 | Vuillaume | ............ | H04L 9/3247 380/277 |
| 2010/0067690 A1 * | 3/2010 | Han | ........................ | G06F 7/725 380/28 |

OTHER PUBLICATIONS

M. Joye and S.M. Yen. The Montgomery Powering Ladder. In B.S. Kaliski Jr., C., .K. Ko., c, and C. Paar (Eds.), Cryptographic Hardware and Embedded Systems—*CHES 2002*, vol. 2523 of *Lecture Notes in Computer Science*, pp. 291-302, Springer-Verlag, 2003.

* cited by examiner

*Primary Examiner* — Ayoub Alata
(74) *Attorney, Agent, or Firm* — Womble Bond Dickinson (US) LLP

(57) ABSTRACT

A method includes: receiving an input message; computing values based on the input message; initializing an accumulator value; iterating, by a processor, through bits of a secret key, each iteration including: selecting a specified number of next most significant bits (MSBs) of the secret key as a bitstring of selected bits; selecting, randomly, one of the values computed from the input message; in a case where all bits of the bitstring of selected bits of the secret key have values of zero: updating the accumulator value based on the specified number of the next MSBs; and performing a dummy operation based on the accumulator value and the randomly selected one of the values computed from the input message; generating an output message based on a value stored in the accumulator value after iterating through the bits of the secret key.

20 Claims, 7 Drawing Sheets

SIDE-CHANNEL RESILIENT PUBLIC KEY CRYPTOGRAPHY

TECHNICAL FIELD

The present disclosure relates to computer security and cryptography.

BACKGROUND

Cryptographic protocols secure information using encryption keys. To preserve the security of encrypted information, the encryption key that is used to secure the information must be kept secret. Symmetric key encryption protocols use the same key for both encrypting and decrypting information. Asymmetric key encryption protocols (or public key cryptographic protocols), use different keys for encrypting and decrypting data. This allows one of the keys (a public key) to be published and the other key (a private key) to be kept secret. Public key cryptography can also be used to implement digital signatures, where the holder of a private key can generate a digital signature based on the document, and a recipient of the document can verify the signature using the corresponding public key.

SUMMARY

According to one embodiment of the present disclosure, a method includes: receiving an input message; computing values based on the input message; initializing an accumulator value; iterating, by a processor, through bits of a secret key, each iteration including: selecting a specified number of next most significant bits (MSBs) of the secret key as a bitstring of selected bits; selecting, randomly, one of the values computed from the input message; in a case where all bits of the bitstring of selected bits of the secret key have values of zero: updating the accumulator value based on the specified number of the next MSBs; and performing a dummy operation based on the accumulator value and the randomly selected one of the values computed from the input message; generating an output message based on a value stored in the accumulator value after iterating through the bits of the secret key.

The values computed from the input message may include $b=2^x-1$ values, where x is the specified number of next MSBs.

The output message may be a modular exponentiation of the input message raised to the power of the secret key, the values computed from the input message may correspond to the input message raised to successive integer powers from 1 to b; the updating the accumulator value may be based on the specified number of next MSBs includes performing a plurality of modular multiplication operations, and the dummy operation may be a dummy modular multiplication operation.

The output message may be a scalar multiplication product of the input message and the secret key, the values computed from the input message may correspond to the input message multiplied by successive integer values from 1 to b; the updating the accumulator value may be based on the specified number of next MSBs includes performing a plurality of addition operations, and the dummy operation may be a dummy addition operation. The scalar multiplication product and the plurality of addition operations may be performed in a finite field defined by an elliptic curve.

The selecting, randomly, the one of the values computed from the input message may be performed using a random number generator, the random number generator being initialized using a seed value computed based on the secret key.

The values computed from the input message may be stored in corresponding ones of a plurality of registers of the processor.

According to one embodiment of the present disclosure, a system includes: a memory storing instructions; a processor; and a cryptographic processing circuit configured to: receive an input message from the memory; store values pre-computed based on the input message in corresponding ones of a plurality of registers of the cryptographic processing circuit; initialize an accumulator value; iterate through bits of a secret key stored in a secure memory, a specified number of bits of the secret key per iteration, each iteration including: selecting the specified number of next most significant bits (MSBs) of the secret key as a bitstring of selected bits; selecting, randomly, one of the pre-computed values; in a case where all bits of the bitstring of selected bits of the secret key have values of zero: updating the accumulator value based on the specified number; and performing a dummy operation based on the accumulator value and the randomly selected one of the pre-computed values; and in a case where at least one bit of the bitstring of selected bits of the secret key has a value of one, updating the accumulator value based on the specified number and based on one of the pre-computed values selected based on the bitstring of selected bits of the secret key; and generate an output message based on a value stored in the accumulator value after iterating through the bits of the secret key.

The pre-computed values may include $b=2^x-1$ pre-computed values, where x is the specified number of next MSBs.

The output message may be a modular exponentiation of the input message raised to the power of the secret key, the pre-computed values may correspond to the input message raised to successive integer powers from 1 to b; the updating the accumulator value based on the specified number of next MSBs may include performing a plurality of modular multiplication operations, and the dummy operation may be a dummy modular multiplication operation.

The output message may be a scalar multiplication product of the input message and the secret key, the pre-computed values may correspond to the input message multiplied by successive integer values from 1 to b; the updating the accumulator value based on the specified number of next MSBs may include performing a plurality of addition operations, and the dummy operation may be a dummy addition operation.

The scalar multiplication product and the plurality of addition operations may be performed in a finite field defined by an elliptic curve.

The cryptographic processing circuit may be further configured to: receive an input setting a differential power analysis protection flag, and in response to receiving the input activating the differential power analysis protection flag, selecting, randomly, the one of the pre-computed values is performed using a random number generator, the random number generator being initialized using a seed value computed based on the secret key.

According to one embodiment to of the present disclosure, a non-transitory computer-readable medium includes stored instructions, which when executed by a processor, cause the processor to generate a digital representation of an integrated circuit including: a processing circuit including a plurality of registers, the processing circuit being configured to: receive an input message; store values pre-computed based on the input message in corresponding ones of the plurality of registers of the processing circuit; initialize an accumulator value; iterate through bits of a secret key, a specified number of bits of the secret key per iteration, each iteration including: selecting the specified number of next most significant bits (MSBs) of the secret key as a bitstring of selected bits; selecting, randomly, one of the pre-computed values; in a case where all bits of the bitstring of selected bits of the secret key have values of zero: updating the accumulator value based on the specified number; and performing a dummy operation based on the accumulator value and the randomly selected one of the pre-computed values; and in a case where at least one bit of the bitstring of selected bits of the secret key has a value of one, updating the accumulator value based on the specified number and based on one of the pre-computed values selected based on the bitstring of selected bits of the secret key; and generate an output message based on a value stored in the accumulator value after iterating through the bits of the secret key.

The pre-computed values may include $b=2^x-1$ pre-computed values, where x is the specified number of next MSBs.

The output message may be a modular exponentiation of the input message raised to the power of the secret key, the pre-computed values may correspond to the input message raised to successive integer powers from 1 to b; the updating the accumulator value based on the specified number of next MSBs may include performing a plurality of modular multiplication operations, and the dummy operation may be a dummy modular multiplication operation.

The output message may be a scalar multiplication product of the input message and the secret key, the pre-computed values may correspond to the input message multiplied by successive integer values from 1 to b; the updating the accumulator value based on the specified number of next MSBs may include performing a plurality of addition operations, and the dummy operation may be a dummy addition operation.

The processing circuit may be further configured to: receive an input setting a differential power analysis protection flag, and in response to receiving the input activating the differential power analysis protection flag, selecting, randomly, the one of the pre-computed values is performed using a random number generator, the random number generator initialized using a seed value computed based on the secret key.

The digital representation of the integrated circuit may further include a secure memory configured to store the secret key.

The digital representation of the integrated circuit may include a system-on-chip including the processing circuit.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
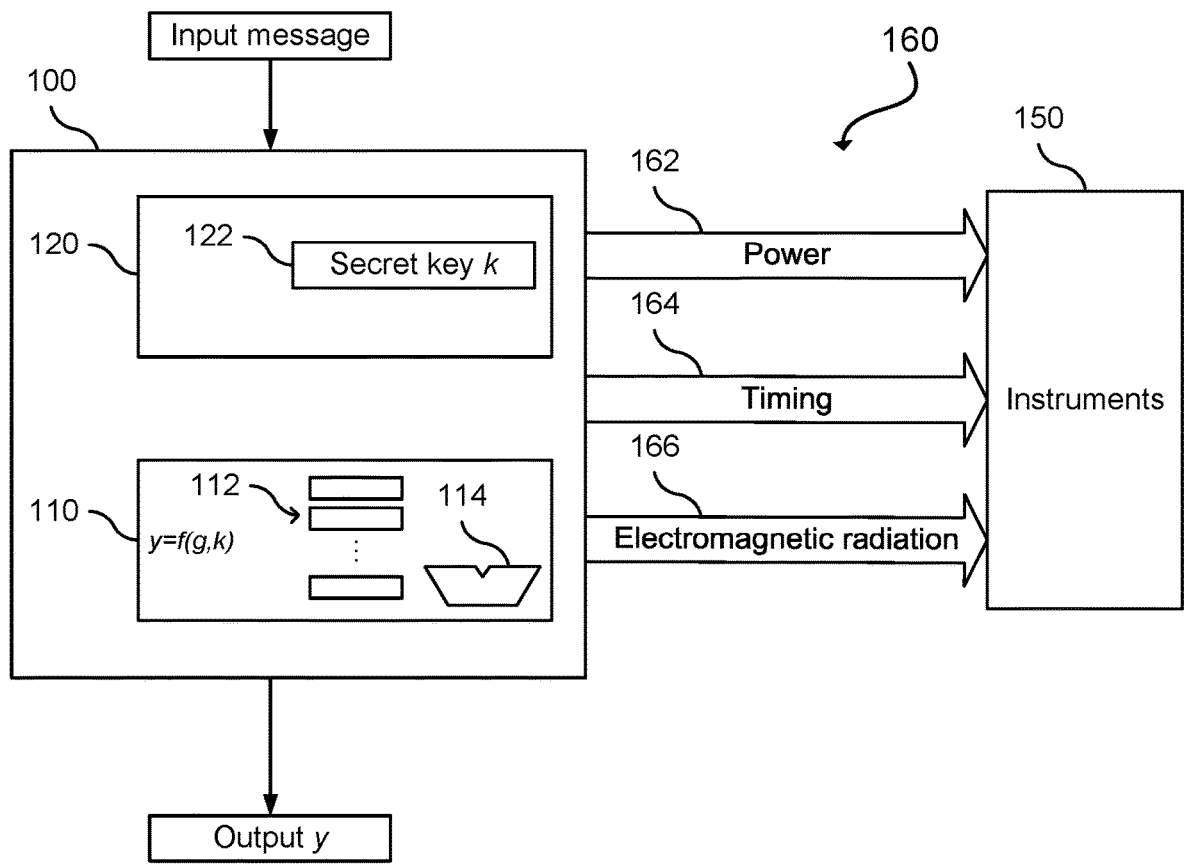
FIG. 1 is a block diagram of a computing device configured to perform cryptographic operations using a secret key stored in the computing device according to one embodiment of the present disclosure.

Aspects of the present disclosure relate to side-channel resilient public key cryptography. To preserve the security of information protected by cryptographic protocols, the secret keys (e.g., the encryption key in the case of symmetric key cryptography or the private key in the case of public key cryptography) associated with that protected information must be kept secret from an adversary. In some use cases, a secret key is stored on a device that is physically accessible to an adversary, such as by being stored in a smartcard, stored in a subscriber identity module (SIM) card, stored in a secure cryptoprocessor (e.g., a trusted platform module), or the like. Such physical devices may include packaging with physical security measures that provide tamper resistance, such that attempting to read the secret key directly from the memory of the physical device may result in destruction of that physical device.

In some circumstances, an adversary attempting to obtain the secret key may have physical access or communicative access to a computing device that stores (or otherwise has access to) the secret key and can induce the device to perform cryptographic operations using that secret key. This relationship creates the possibility of a side-channel attack, in which an attacker collects side-channel information from an electronic device (e.g., a computer system) during an encryption or decryption process, and this side-channel information reveals the underlying content of a secret key. Side channel information includes information outside of what is explicitly part of the execution path of the program or electronic circuit implementing the encryption or decryption process (e.g., the memory storing the secret key, the intermediate values computed by the algorithm, and the values stored and computed by components of the processor), where examples of side-channel information include central processing unit (CPU) usage or load information (e.g., percentage of CPU time consumed), timing information (e.g., the time elapsed to perform a computation), energy consumption information (e.g., the energy consumed at different points in time in the computation process), electromagnetic leaks (e.g., electromagnetic fields emitted by the processor during computation), and the like.

For example, some public key cryptographic algorithms such as Rivest-Shamir-Adelman (RSA), elliptic-curve cryptography (ECC), Diffie-Hellman (DH) key-exchange, and digital signature algorithm (DSA) perform modular exponentiation and/or scalar multiplication steps based on a secret key. For example, in RSA computing a ciphertext c involves computing a message m (encoded as an integer)

raised to the power of a public key e, modulo n (c m$^e$ (mod n)). Modular exponentiation is also used to decrypt the ciphertext c using private key d to recover the original message m by computing c raised to the power of private key d, modulo n (c$^d$=m (mod n)). As another example, ECC makes use of scalar multiplication in performing encryption and decryption operations. These modular exponentiation and scalar multiplication steps are time consuming and therefore processing devices configured to perform cryptographic operations (such as encryption and decryption of messages) may implement techniques for accelerating these steps.

As one example, modular exponentiation can be accelerated using a square-and-multiply approach. In modular exponentiation, given input data g and a t-bit secret key k (where t may be, for example, 512 bits or more, such as 4096 bits (4 kilobits or kb)), a process of computing an output y where y=g$^k$ may include iterating over the t bits of the secret key k (proceeding from the most significant bit (MSB) to the least significant bit (LSB)). After initializing an accumulator value $R_0$ to a value of 1, if the current bit (e.g., a j-th bit) of the secret key k is a 0 (e.g., $k_j$=0), then the accumulator value is squared (e.g., $R_0$=$(R_0)^2$), and if the current bit of the secret key k is 1 (e.g., $k_j$=1), then the accumulator value is squared and then multiplied by g (e.g., $R_0$=$(R_0)^2$*g). The process is repeated for all t bits of the secret key k and, after processing all t bits, the accumulator $R_0$ holds the desired result y=g$^k$. This process of performing modular exponentiation is faster than (e.g., requires a processing circuit to perform fewer operations than) an alternative technique of performing k multiplications of an accumulator value by the message g, modulo n.

In some computing devices or processing circuits, squaring operations and multiplication (or multiply) operations have different power characteristics. For example, a multiplication operation may consume more power than a squaring operation. As another example, performing a squaring operation followed by a multiplication operation takes more time than performing only a squaring operation. As a third example, a squaring operation and a multiplication operation may cause different portions of the processing circuit of the computing device to be activated and therefore cause different electromagnetic fields to be radiated from the computing device.

Scalar multiplication as used for ECC can be accelerated in a similar manner by performing doubling operations or doubling followed by addition (or add or summing) operations, depending on whether the current bit of the secret key k is a zero or one, respectively. In a similar manner, in some computing devices or processing circuits, doubling operations and addition operations consume different amounts of power, have different timing, and/or generate different electromagnetic fields.

A computing device implementing a cryptographic system may be referred to as being susceptible to simple power analysis (SPA) in a case where an adversary can obtain the secret key using a single power trace (e.g., by placing a probe at the power supply of the computing device performing the cryptographic operation). Similarly, a cryptographic system may be referred to as being susceptible to timing analysis (TA) and/or simple electromagnetic analysis (SEMA) in cases where a single timing trace (e.g., by monitoring the time consumed by the computing device during each step of the cryptographic operations) and/or a single electromagnetic trace (e.g., collecting electromagnetic traces through antennas or other probes placed on or near the computing device) is sufficient to obtain the secret key. Such a secret key may be referred to as being leaked through a side-channel and such adversarial attempts to exfiltrate a secret key from a computing device may be referred to as a side-channel attack.

Some approaches to protecting against SPA, TA, and SEMA relate to adding noise (e.g., randomness) to the cryptographic system. Depending on how the noise is added, performing differential power analysis (DPA), differential electromagnetic analysis (DEMA), or differential timing analysis (DTA) by capturing multiple traces (e.g., over different executions of the cryptographic operations using the same secret key) may reveal the value of the secret key.

Some countermeasures for mitigating side channel attacks relate to performing additional operations (e.g., dummy operations). In the above example of modular exponentiation, a dummy multiply operation may be performed as a countermeasure when the value of the current bit is 0, such that the computing device always performs a square operation and a multiply operation whether the current bit of the secret key k has a value of 0 or a value of 1. However, this countermeasure technique significantly increases in power consumption and harms in performance (e.g., throughput) due to the overhead imposed by the large number of dummy multiply operations. For example, assuming that approximately half of the bits in the secret key k of length t are 0 bits, then this countermeasure adds t/2 multiply operations to a process for computing a modular exponentiation.

Accordingly, aspects of embodiments of the present disclosure relate to side-channel resilient public-key cryptography, including providing countermeasures to side-channel attacks (such as the above-described SPA, SEMA, TA, DPA, DEMA, and DTA) in a manner that provides higher performance and lower power consumption than other countermeasures to side-channel attacks. Some aspects of embodiments relate to processing multiple bits of the secret key k at a time (e.g., x bits at a time, where x≥2), which reduces the number of iterations required to process the entire secret key k of length t bits, and processing the x bits of each iteration in a manner that reduces the reduces the number of dummy operations that are performed overall (e.g., such that, on average, fewer than t/2 dummy operations are performed for a secret key k of length t bits).

Technical advantages of the present disclosure include, but are not limited to, providing resilience against side-channel attacks (e.g., SPA, SEMA, TA, DPA, DEMA, and DTA) in a computing device configured to perform cryptographic operations (e.g., encryption, decryption, signing, and/or signature verification of data) while providing increased performance (e.g., throughput) and reduced power consumption compared to other computing devices that are configured to perform cryptographic operations in a manner that protects against side-channel attacks. In more detail, in some embodiments, fewer dummy operations are performed than in other countermeasures, and the number of dummy operations performed is configurable (with a tradeoff of increased memory consumption for fewer dummy operations). Some aspects of embodiments of the present disclosure further provide protection against differential attacks by using a deterministic random number generator (DRNG), such that the side-channel information produced between different runs is substantially the same, thereby providing protection against differential attacks (e.g., DPA, DEMA, and DTA). Embodiments of the present disclosure are applicable to multiple different cryptography protocols, including Rivest-Shamir-Adelman (RSA), elliptic curve cryptography (ECC), Diffie-Hellman (DH) key-exchange, and digital signature algorithm (DSA). Furthermore, some aspects of embodiments of the present disclosure relate to configurable modes of operation that correspond to different trade-offs between resilience against certain types of side-channel attacks and further improved performance.

FIG. 1 is a block diagram of a computing device configured to perform cryptographic operations using a secret key stored in the computing device according to one embodiment of the present disclosure. Referring to FIG. 1, a computing device 100 includes a processing circuit 110 (or processor) and a secure memory 120. As shown in FIG. 1, the secure memory 120 stores a secret key k 122. The secure memory 120 stores instructions that, when executed by the processing circuit 110, cause the processing circuit 110 to perform operations according to various embodiments of the present disclosure. In various embodiments of the present disclosure, the secure memory 120 may include one or more of: an internal register (e.g., flip-flops) within the computing device, dynamic random-access memory (DRAM), static random-access memory (SRAM), non-volatile memory (e.g., NAND flash memory, hard disk drives, optical media, and electrically erasable programmable read-only memory (EEPROM)), and the like. In some embodiments of the present disclosure, the secure memory 120 may include a tamper-resistant memory, such as a memory within a trusted platform module (TPM) or other secure co-processor.

The computing device 100 may be implemented as, or as a component of, one or more of: a central processing unit (CPU), a cryptographic accelerator or cryptoprocessor (e.g., a hardware security module (HSM) or a trusted platform module (TPM)), a system on chip (SoC), an application processor (AP), a graphics processing unit (GPU), a field programmable gate array (FPGA), an application specific integrated circuit (ASIC), a digital signal processor (DSP), a network interface controller (NIC) (such as in a baseband processor (BP) thereof) such as for a wired Ethernet connection or a wireless network connection (e.g., Wi-Fi), a mass device storage controller (e.g., a controller for a flash memory storage device or for a hard disk drive), an interface controller (e.g., a controller for a peripheral bus such as universal serial bus (USB), DisplayPort, Bluetooth®, or other wired or wireless protocol), and the like.

Accordingly, the processing circuit 110 may be integrated into, for example, a server computer system, a desktop computer system, a laptop computer system, a smartphone, a tablet computer, computer network hardware (e.g., router, a virtual private network (VPN) device, a load balancer, and the like), cellular network hardware (e.g., a cellular base transceiver station and/or cellular base station controller), a smartcard, and the like. The processing circuit 110 includes a plurality of registers 112 (or processor registers), where each of the registers stores data (e.g., a 32-bit or 64-bit word). In some cases, such as in a vector processor or single instruction multiple data (SIMD) processor, a vector register may hold multiple values (a vector of values), where a single instruction can operate on all of the values in the vector concurrently or simultaneously. The processing circuit 110 may also include one or more arithmetic logic units 114 (ALU) configured to perform arithmetic calculations (e.g., addition, multiplication, division, bit shifts, and the like) on input operands, where the input operands may be provided from the registers 112, and where the output of an ALU 114 may be written to one of the registers 112.

The computing device 100 may be configured to perform cryptographic operations such as encrypting a message, decrypting a ciphertext, generating of a cryptographic signature, and verifying a cryptographic signature. Depending on the cryptographic protocol (e.g., RSA, DSA, or ECC), different mathematical operations may be applied to perform these operations.

In the example shown in FIG. 1, the computing device 100 receives a message g and produces an output y based on the message g and a secret key k of length t bits (e.g., $k=(k_{t-1}, \ldots, k_0)_2$), where the secret key k may be stored internally by the computing device 100 (e.g., in the secure memory 120). In some embodiments, the secure memory 120 further stores instructions that configure the processing circuit 110 to perform operations for computing the output y based on the message g and the secret key k (e.g., where y is a function $f$ of g and k or, as shown in FIG. 1, $y=f(g, k)$). In some embodiments, the instructions that configure the processing circuit 110 to perform the operations are stored in a separate memory from the secure memory 120 (e.g., a memory with reduced tamper resistance). For example, as noted above, RSA makes use of modular exponentiation (e.g., $y=g^k$ mod n) and ECC makes use of scalar multiplication, sometimes referred to as point multiplication, (e.g., $y=k \cdot g$) to perform cryptographic operations.

An attacker may use instruments 150 to gather information from the computing device 100, where this information may appear in side-channels 160 such as power consumption 162 (e.g., by monitoring the power draw of the computing device from its power supply), timing information 164 (e.g., by monitoring the time taken by the computing device to perform cryptographic operations), and electromagnetic fields 166 (e.g., by using an antenna to monitor electromagnetic radiation emitted by the computing device 100). As noted above, by using this side-channel information, the attacker may use the power consumption information 162 to perform simple power analysis (SPA) or differential power analysis (DPA), may use the timing information 164 to perform timing analysis (TA) or differential timing analysis (DTA), and may use the electromagnetic radiation information 166 to perform simple electromagnetic analysis (SEMA) or differential electromagnetic analysis (DEMA), where these techniques may be used to attempt to exfiltrate the secret key k that was used by the computing device 100 to compute the output y in response to the message g. Aspects of embodiments of the present disclosure relate to computing devices 100 that implement cryptographic operations using the processing circuit 110 that are resilient against such side-channel attacks, such that the side-channels 160 do not provide meaningful information that can be used to deduce the secret key k.

Figure 2:
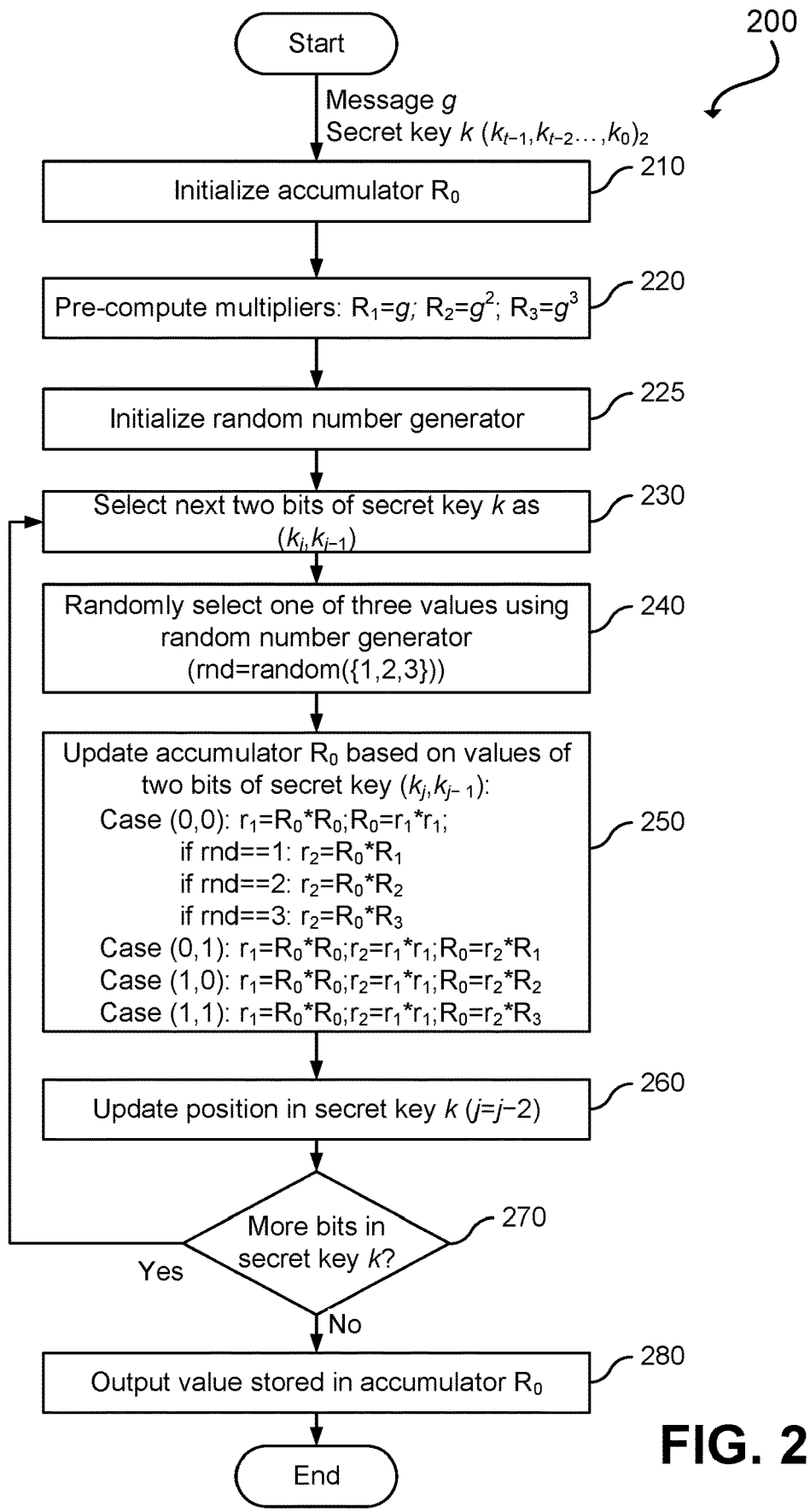
FIG. 2 is a flowchart of a method for computing a modular exponentiation, two bits of the exponent at a time, according to one embodiment of the present disclosure.

FIG. 2 is a flowchart of a method 200 for computing a modular exponentiation, two bits of the exponent at a time, according to one embodiment of the present disclosure. Given an input integer g representing a message (e.g., a message to be encrypted or a message to be decrypted) and a secret key k, the method 200 computes an output y, where $y=g^k$ mod n. The arithmetic operations performed by the processing circuit 110 and described herein will be assumed to be modular arithmetic operations performed in a finite field (e.g., a finite field of size n), and therefore the modular exponentiation $y=g^k$ mod n may be referred to herein more compactly as $y=g^k$. Likewise, unless indicated otherwise, multiplication and addition arithmetic operations as described herein refer to modular arithmetic operations (e.g., arithmetic operations that are performed modulo n). The secret key k is t bits long and can be expressed as a string of bits or bitstring $(k_{t-1}, \ldots, k_0)_2$. As noted above, t may be, for example, 4096, although embodiments of the present disclosure are not limited to a particular key length (e.g., the key may have fewer than 4096 bits or more than 4096 bits).

At 210, the processing circuit 110 initializes an accumulator $R_0$. The accumulator $R_0$ may be stored, for example, in a register of the processing circuit 110. The accumulator $R_0$ stores a current accumulated result and will hold the desired output value y at the end of the modular exponentiation operation. In some embodiments, the accumulator is initialized to a value of 1.

At 220, the processing circuit 110 pre-computes multipliers that will be used during the remaining portion of the computation of the modular exponentiation. These pre-computed multipliers include: $R_1$ which stores the value g, $R_2$ which stores the value $g^2$ (g squared or g to the power of 2); and $R_3$ which stores the value $g^3$ (g cubed or g to the power of 3). As noted above, these values are computed using modular arithmetic.

In some embodiments of the present disclosure, instead of initializing the accumulator $R_0$ to a value of 1 at 210, the accumulator $R_0$ is initialized based on the value of the two most significant bits (MSBs) of the secret key k. In a case where the first two bits are (0,0), then the processing circuit initializes the accumulator $R_0$ to a value of 1. In a case where the first two bits are (0,1), then the processing circuit initializes the accumulator $R_0$ to a value of g (e.g., the value stored in $R_1$). In a case where the first two bits are (1,0), then the processing circuit initializes the accumulator $R_0$ to a value of $g^2$ (e.g., the value stored in $R_2$). In a case where the first two bits are (1,1), then the processing circuit initializes the accumulator $R_0$ to a value of $g^3$ (e.g., the value stored in $R_3$).

At 225, the processing circuit 110 initializes a random number generator or entropy generator (e.g., a deterministic random number generator DRNG or pseudorandom number generator PRNG). Examples of deterministic random number generators and pseudorandom number generators include the Mersenne Twister, xorshift generators, well equidistributed long-period linear (WELL) generators, cryptographically secure pseudorandom number generators such as stream ciphers, block ciphers running in counter or output feedback mode, and the like. A DRNG or a PRNG may be supplied with a seed value and generate a sequence of numbers based on that seed value. The sequence of numbers may be referred to as being deterministic or pseudorandom because the sequence is always the same for a given seed value (e.g., generated deterministically based on the seed value) and otherwise has properties that approximate properties of truly random sequences (e.g., the values of the numbers in the sequence are difficult to predict without knowing the seed value and without knowing the underlying process for generating the sequence).

In a case where the method 200 is performed with protection against differential power analysis (DPA), processing circuit 110 initializes the random number generator using a seed that is computed based on the key k (e.g., some function ƒ of k), such that repeated executions of the method 200 using the same secret key k and the same message g will have substantially the same power usage characteristics, as will be discussed in more detail below. In a case where the method 200 is performed without enabling such a protection against DPA, the random number generator may be initialized using a random value (e.g., set using another source of entropy, such as a hardware random number generator that uses characteristics such as noise measured from a physical sensor), based on a fixed value, or based on other values (e.g., based on a current timestamp).

At 230, the processing circuit 110 selects the next two bits of the secret key k. An index variable j may be used to indicate a current position in the secret key. In a case where the accumulator $R_0$ is initialized to a value of 1 (e.g., initialized without considering the two most significant bits of the secret key k) then, in a first iteration, the processing circuit 110 initializes the index variable j to t−1 and selects the two most significant bits of the secret key k (($k_j$, $k_{j-1}$)=($k_{t-1}$, $k_{t-2}$)). In a case where the accumulator $R_0$ was initialized based on the value of the two MSBs of the secret key k, then the processing circuit 110 initializes the index variable j to t−3 and selects the third and fourth MSBs of the secret key k (($k_j$, $k_{j-1}$)=($k_{t-3}$, $k_{t-4}$)).

At 240, the processing circuit 110 uses the random number generator to select a random value rnd from a set of three options (e.g., selecting randomly between the set of values {1, 2, 3}).

At 250, the processing circuit 110 updates the value of the accumulator based on the four different possible cases for a pair of bits ($k_j$, $k_{j-1}$). In particular, any two bits may take on four different values: (0,0), (0,1), (1,0), or (1,1). (These pairs of bits may also be interpreted as representing an integer—0, 1, 2, or 3, respectively.) In cases other than where the bits were (0,0), the processing circuit 110 computes the fourth power of the accumulator $R_0$ through repeated squaring and stores this value in a temporary variable ($r_1 = R_0 * R_0$; $r_2 = r_1 * r_1$;). In the case where the bits were (0,1), the accumulator $R_0$ is then updated with the value of the temporary variable multiplied by $R_1$ ($R_0 = r_2 * R_1 = (R_0)^4 * g$), in the case where the bits were (1,0), the accumulator $R_0$ is updated with the value of the temporary variable multiplied by $R_2$ ($R_0 = r_2 * R_2 = (R_0)^4 * g^2$), and in the case where the bits were (1,1), the accumulator is multiplied by $R_3$ ($R_0 = r_2 * R_3 = (R_0)^{4} * g^3$).

In the case where the bits were (0,0), then the accumulator is only raised to the fourth power (e.g., $r_1 = R_0 * R_0$; $R_0 = r_1 * r_1$;), and no further multiplication by the pre-computed multiplier is necessary (e.g., the accumulator could be multiplied by $g^0 = 1$, which is a non-operation). However, failing to perform an additional multiplication operation for the case of (0,0) could result in the leak of side channel information through power analysis or timing analysis. Specifically, if only two multiplication operations were performed in the case where the bits of the secret key were (0,0) whereas three multiplication operations were performed in the other three cases, then information about the value of the secret key k through the power consumption of the processing circuit 110 or because no additional time was spent performing the third multiplication operation.

Accordingly, in some embodiments in which protection against side channel attacks is enabled (e.g., protection against SPA or DPA), the processing circuit 110 performs a dummy multiplication operation of the accumulator value $R_0$ by a value and stores that value in a temporary variable. Because the power consumption associated with multiplying by the three different multipliers ($R_1$, $R_2$, $R_3$) may be different, the processing circuit 110 uses the random value (rnd) to select between the three possibilities.

As noted above, when protection against DPA is turned on, the random number generator is initialized or seeded based on a seed value that is computed from the secret key k. Accordingly, the processing circuit 110 will generate the same sequence of random values (rnd) across different cryptographic operations, such that the same multipliers are chosen for the dummy multiplication operation each time. In a situation where protection against DPA was not turned on and different seed values were used to initialize the random number generator during different encoding processes, then an attacker could detect which parts of the secret key k had values (0,0) using differential power analysis by detecting the points at which the power consumption differed between runs (e.g., due to different multipliers having different levels of power consumption being used for the dummy multiplication operation).

At 260, the processing circuit 110 updates the index variable j to proceed with the next two bits of the secret key k, such as by decrementing the index variable j by two (e.g., j=j−2).

At 270, the processing circuit 110 determines if there are more bits remaining in secret key k. For example, in some embodiments, the processing circuit 110 makes this determination based on whether the index variable j is non-negative (j≥0). If there are more bits to be processed, than the processing circuit 110 proceeds with selecting the next two bits of the secret key k (($k_j$, $k_{j-1}$)) at 230 based on the current value of the index variable j. If there are no additional bits, then at 280 the processing circuit 110 outputs the value stored in the accumulator $R_0$ as the result of the modular exponentiation of the input message g to the secret key k ($g^k$).

In some embodiments, the dummy operations performed when the bits are (0,0) are omitted, such as when operating in a mode where SPA and DPA protections are disabled. For example, the SPA and DPA protections may be disabled when performing the operations using a public key in a public key cryptography system, because the public key is not secret and therefore does not need to be protected against side-channel attacks. There are also use cases in which the protections could be disabled to increase performance, for example if the interested party (e.g., holder of the private key) does not need to use protections if the electronic circuit was not accessible to an attacker (e.g., contained within a secured enclosure).

Table 1, below, summarizes three modes of operation according to some embodiments of the present disclosure. In different modes, a simple power analysis flag (SPA_flag) may be used to enable or disable protection against SPA attacks and a differential power analysis flag (DPA) flag may be used to enable or disable protection against DPA attacks. For example, the SPA_flag and/or the DPA_flag may be a setting in memory and set by a message sent to the computing device 100. As another example, the computing device 100 may include an input port or input pin (e.g., in a case where the computing device is a discrete integrated circuit or chip or in a case where the computing device is a sub-circuit in a larger integrated circuit such as a system-on-chip) corresponding to each of the SPA_flag and the DPA_flag, such that a logic value of 0 or 1 supplied to the input port or input pin sets the corresponding flag (SPA_flag or DPA_flag) to be on or off.

TABLE 1

| Modes | SPA_flag | DPA_flag | Protection against | Performance Improvement |
|---|---|---|---|---|
| (i) | 0 | 0 | No protection | High |
| (ii) | 1 | 0 | TA, SPA, SEMA protection | Medium |
| (iii) | X | 1 | TA, SPA, SEMA, DPA, DEMA protection | Medium, Low* |

*If the deterministic entropy engine versus random entropy engine exhibit similar performance, then there is no difference in the performance improvement achieved between modes (ii) and (iii). If the deterministic entropy engine is implemented in software or run in sequential in hardware, then it might lead to performance degradation.

In some embodiments, the SPA flag and the DPA flag both control the execution of the dummy multiplication operations when the bits are (0,0), such that dummy multiplication operations are not performed when both SPA flag and DPA flag are off (or 0) and dummy multiplication operations are performed when either the SPA flag or the DPA flag is on (or 1).

In some embodiments, the DPA flag controls whether the processing circuit 110 initializes the random number generator at 225 using a seed value derived from the secret key k in the case where DPA_flag is off or 0 or using a seed value obtained from another source in the case where the DPA_flag is on or 1 (e.g., another source of entropy such as a hardware random number generator or another PRNG seeded based on a current time).

When neither of the two flags are set, the method according to some embodiments improves performance over comparative approaches but provides no additional protection against side channel attacks. When only the SPA_flag is set, the method according to some embodiments provides performance improvement in addition to protection against TA, SPA, and SEMA attacks. When DPA_flag is set, the method according to some embodiments provides performance improvement in addition to protection against TA, SPA, DPA, SEMA, and DEMA attacks.

Table 2, below, depicts a method for performing modular exponentiation, two bits of the secret key at a time, and explicitly showing the use of the SPA_flag and DPA_flag according to one embodiment of the present disclosure.

TABLE 2

```
Input: g, k = (k_{t-1}, ... , k_0)_2
Output: y = g^k
R_0 = 1; R_1 = g; R_2 = g^2; R_3 = g^3  → Precomputations
if (k_{t-1}, k_{t-2} = 0,0) then R_0 = R_0
if (k_{t-1}, k_{t-2} = 0,1) then R_0 = R_1
if (k_{t-1}, k_{t-2} = 1,0) then R_0 = R_2
if (k_{t-1}, k_{t-2} = 1,1) then R_0 = R_3
if (DPA_flag = 1) then
    entropy_gen.seed(f(k))  // Deterministic random numbers dependent on k required
else
    entropy_gen.seed(random( ))  // Deterministic random numbers not required
for j = t − 3 downto 0 do
    RAND = entropy_gen.get( )    //RAND = {1,2,3}
    i = int(k_j, k_{j−1})_2
    if (k_j = 0) then
        if (RAND = 1) then
            r_1 = R_0 * R_0; R_0 = r_1 * r_1;
            If (SPA_flag = 1 or DPA_flag = 1) then
                r_2 = R_0 * R_1
        if (RAND = 2) then
            r_1 = R_0 * R_0; R_0 = r_1 * r_1;
```

TABLE 2-continued

```
    If (SPA_flag = 1 or DPA_flag = 1) then
        r₂ = R₀ * R₂
    if (RAND = 3) then
        r₁ = R₀ * R₀; R₀ = r₁ * r₁;
        If (SPA_flag = 1 or DPA_flag = 1) then
            r₂ = R₀ * R₃.
    if (k_j = 1) then r₁ = R₀ * R₀; r₂ = r₁ * r₁; R₀ = r₂ * R₁
    if (k_j = 2) then r₁ = R₀ * R₀; r₂ = r₁ * r₁; R₀ = r₂ * R₂
    if (k_j = 3) then r₁ = R₀ * R₀; r₂ = r₁ * r₁; R₀ = r₂ * R₃
    j = j − 2
return R₀
```

Some aspects of embodiments of the present disclosure relate to combining more bits of the key during each iteration, which may further improve performance with a tradeoff of increasing the storage corresponding to the pre-computed multipliers.

Figure 3:
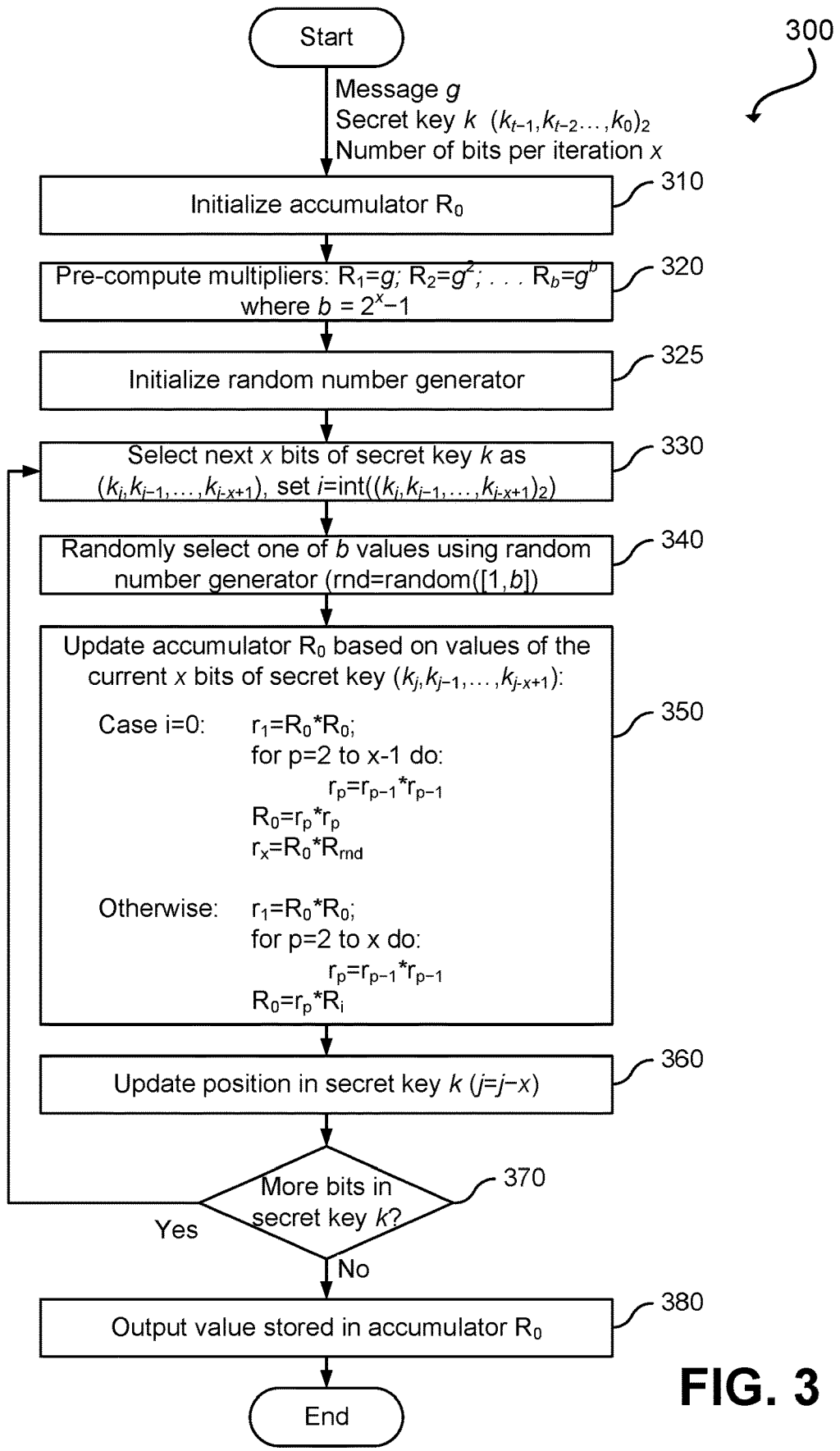
FIG. 3 is a flowchart of a method for computing a modular exponentiation, x bits of the exponent at a time (where x is an integer greater than or equal to 2) according to one embodiment of the present disclosure.

FIG. 3 is a flowchart of a method 300 for computing a modular exponentiation, x bits of the exponent at a time (where x is an integer greater than or equal to 2) according to one embodiment of the present disclosure. The embodiments illustrated with respect to FIG. 3 may be considered as a generalization of the embodiments shown in FIG. 2, where embodiments shown with respect to FIG. 2 were implemented for the case of considering 2 bits during each iteration and where FIG. 3 allows the configuration of the processing circuit 110 to process some specified number of bits during each iteration, where the number of bits is indicated using the variable x.

In a manner similar to that described above with respect to FIG. 2, given an input integer g representing a message (e.g., a message to be encrypted or a message to be decrypted) and a secret key k, the method 300 computes an output y, where $y=g^k$ mod n. As before, the arithmetic operations performed by the processing circuit 110 and described herein will be assumed to be modular arithmetic operations performed in a finite field (e.g., a finite field of size n), and therefore the modular exponentiation $y=g^k$ mod n may be referred to herein more compactly as $y=g^k$. Likewise, unless indicated otherwise, multiplication and addition arithmetic operations as described herein refer to modular arithmetic operations (e.g., arithmetic operations that are performed modulo n). The secret key k is t bits long and can be expressed as a string of bits or bitstring $(k_{t-1} \ldots, k_0)_2$.

At 310, the processing circuit 110 initializes an accumulator $R_0$. The accumulator $R_0$ may be stored, for example, in a register of the processing circuit 110. The accumulator $R_0$ stores a current accumulated result and will hold the desired output value y at the end of the modular exponentiation operation. In some embodiments, the accumulator is initialized to a value of 1. In some circumstances, the length of the secret key t is not divisible by the number of bits per iteration x. In some embodiments, before initializing the value of $R_0$, the processing circuit 110 performs a modulo check to determine divisibility of the length of the secret key t by the number of bits per iteration x and padding the secret key with zeroes at the MSB such that the length of the padded secret key is divisible by x. For example, if the key-size t is 9 and x=2, then one zero is concatenated or appended onto the MSB end of the secret key k such that the length of the key is now divisible by x and the value of the exponent/key is not changed.

At 320, the processing circuit 110 pre-computes multipliers that will be used during the remaining portion of the computation of the modular exponentiation. In particular, b different multipliers are initialized, $R_1$ through $R_b$, where $b=2^x-1$, and where $R_i=g^i$. As noted above, these values are computed using modular arithmetic, where $R_i=g^i$ in this context means $R_i=g^i$ mod n. The number of pre-computed multipliers b grows exponentially with respect to the number of bits x that are processed during each iteration, therefore resulting in a tradeoff between memory and computational acceleration based on the configuration parameter of the number of bits x.

In some embodiments of the present disclosure, instead of initializing the accumulator $R_0$ to a value of 1 at 310, the accumulator $R_0$ is initialized based on the value of the x most significant bits (MSBs) of the secret key k $(k_{t-1}, \ldots, k_{t-x})$. In more detail, interpreting the first x bits of the secret key k as an integer w, then $R_0$ is initialized to $R_w$ from among the b pre-computed multipliers $R_1$ through $R_b$.

At 325, the processing circuit 110 initializes a random number generator or entropy generator (e.g., a deterministic random number generator DRNG or pseudorandom number generator PRNG). In a manner similar to that described above, if protection against differential attacks is enabled, then the processing circuit 110 initializes the random number generator based on a seed value computed based on the secret key k. Otherwise, the processing circuit may initialize the random number generator using a random value (e.g., set using another source of entropy, such as a hardware random number generator that uses characteristics such as noise measured from a physical sensor), based on a fixed value, or based on other values (e.g., based on a current timestamp).

At 330, the processing circuit 110 selects the next x bits of the secret key k. As above, an index variable j may be used to indicate a current position in the secret key. In a case where the accumulator $R_0$ is initialized to a value of 1 (e.g., initialized without considering the two most significant bits of the secret key k) then, in a first iteration, the processing circuit 110 initializes the index variable j to t−1 and selects the x most significant bits of the secret key k (e.g., $(k_j, k_{j-1}, \ldots, k_{j-x+1})=(k_{t-1}, k_{t-2}, \ldots, k_{t-x})$). In a case where the accumulator $R_0$ was initialized based on the value of the x MSBs of the secret key k, then the processing circuit 110 initializes the index variable j to t−x and selects the next x MSBs of the secret key k (e.g., $(k_j, k_{j-1}, \ldots, k_{j-x+1})=(k_{t-x-1}, k_{t-x-2}, \ldots, k_{t-2x})$).

At 340, the processing circuit 110 uses the random number generator to select a random value (rnd) from a set of b options (e.g., selecting randomly between the set values 1 through b).

At 350, the processing circuit 110 updates the value of the accumulator based on the number of bits in the sequence or bitstring of x selected bits $(k_j, k_{j-1}, \ldots, k_{j-x+1})$ and the value of the bits in the bitstring. The current bitstring of x bits can be interpreted as an integer $i=int((k_j, k_{j-1}, \ldots, k_{j-x+1})_2)$.

In a case where i≠0 (corresponding to a case where at least one of the x bits is non-zero), the processing circuit 110 initializes a temporary variable $r_1$ to the square of the current value of the accumulator $R_0(r_1=R_0*R_0)$ and then iterates from 2 to x using an index variable p, where at each iteration, the processing circuit 110 computes the square of the previously computed value: $r_p=r_{p-1}*r_{p-1}$. After computing $r_x$, the processing circuit 110 has computed a value in the accumulator $R_0$ that depends on the number of bits in the bitstring of x selected bits (e.g., that depends only on the number x), and then further computes the updated value of the accumulator $R_0$ based on $r_x$ and a pre-computed multiplier as selected based on the integer representation i of the x bit bitstring: $R_0=r_x*R_i$.

In a case where i=0 (corresponding to a case where all x bits are 0), the processing circuit 110 initializes a temporary variable $r_1$ to the square of the current value of the accu- At 370, the processing circuit 110 determines if there are more bits remaining in secret key k. For example, in some embodiments, the processing circuit 110 makes this determination based on whether the index variable j is non-negative (j≥0). If there are more bits to be processed, than the processing circuit 110 proceeds with selecting the next x bits of the secret key k $((k_j, k_{j-1}, \ldots, k_{j-x+}))$ at 330 based on the current value of the index variable j. If there are no additional bits, then at 380 the processing circuit 110 outputs the value stored in the accumulator $R_0$ as the result of the modular exponentiation of the input message g to the secret key k ($g^k$).

Table 3, below, depicts a method for performing modular exponentiation, x bits of the secret key at a time, and explicitly showing the use of the SPA_flag and DPA_flag according to one embodiment of the present disclosure.

TABLE 3

```
Input: g, k = (k_{t-1}, ... , k_0)_2
Output: y = g^k
x = number of key-bits combined (more than 2)
b = 2^x - 1
for i = b downto 0 do
    R_i = g^i  → Precomputations
w = int(k_{t-1}, . . . , k_{t-x})_2
R_0 = R_w
if (DPA_flag = 1) then
    entropy_gen.seed(f(k)) //Seed the entropy generator with a unique value dependent
    on k to prevent DPA attacks
else
    entropy_gen.seed( ) // Seeding the entropy generator not required
for j = t - x - 1 downto 0 do
    i = int(k_j, ... , k_{j-x+1})_2
    rnd = entropy_gen.get( )      //rnd = k in [1, b]
    if (i = 0) then
        r_1 = R_0 * R_0;
        for p = 2 to x - 1 do
            r_p = r_{p-1} * r_{p-1};
        R_0 = r_{x-1} * r_{x-1};
        If (SPA_flag = 1 or DPA_flag = 1) then
            r_x = R_0 * R_{rnd}
    else then r_1 = R_0 * R_0;
        for p = 2 to x do
            r_p = r_{p-1} * r_{p-1};
        R_0 = r_x * R_i;
    j = j - x
return R_0
``` mulator $R_0(r_1=R_0*R_0)$ and then iterates from 2 to x−1 using an index variable p, where at each iteration, the processing circuit 110 computes $r_p=r_{p-1}*r_{p-1}$. After computing $r_{x-1}$, the processing circuit 110 computes the updated value of the accumulator $R_0$ based on $r_{x-1}$ as $R_0=r_{x-1}*r_{x-1}$. Accordingly, in the case where i=0, the processing circuit 110 computes the updated value of the accumulator $R_0$ based only on the number x of selected bits.

However, in a manner similar to that described above with respect to FIG. 2, in the case of i=0, there is one fewer multiplication operation performed than in the case where i≠0 (e.g., in the case of i=0, the iteration is performed from 2 to x−1 versus from 2 to x in the case of i≠0). As such, in some embodiments, the processing circuit 110 performs a dummy multiplication operation where a temporary or dummy variable $r_x$ is assigned the value of $R_0$ multiplied by the randomly selected pre-computed multiplier $R_{rnd}$ (where the value of rnd was set at 340 using the random number generator was used to select a random value from 1 to b).

At 360, the processing circuit 110 updates the index variable j to proceed with the next x bits of the secret key k, such as by decrementing the index variable j by x (e.g., j=j−x).

Accordingly, aspects of embodiments of the present disclosure relate to performing modular exponentiation of a message g to the power of a secret key k, taking the x bits of the secret key k at a time when iterating through the secret key k (where x is greater than or equal to 2). Increasing the number of bits x increases the throughput of a processing circuit implementing modular exponentiation in accordance with embodiments of the present disclosure, with a tradeoff of increased memory usage as the number of bits x increases.

While some aspects of embodiments of the present disclosure are described above with respect to modular exponentiation, embodiments of the present disclosure are not limited thereto and similar techniques may be applied to other operations, such as scalar multiplication.

Figure 4:
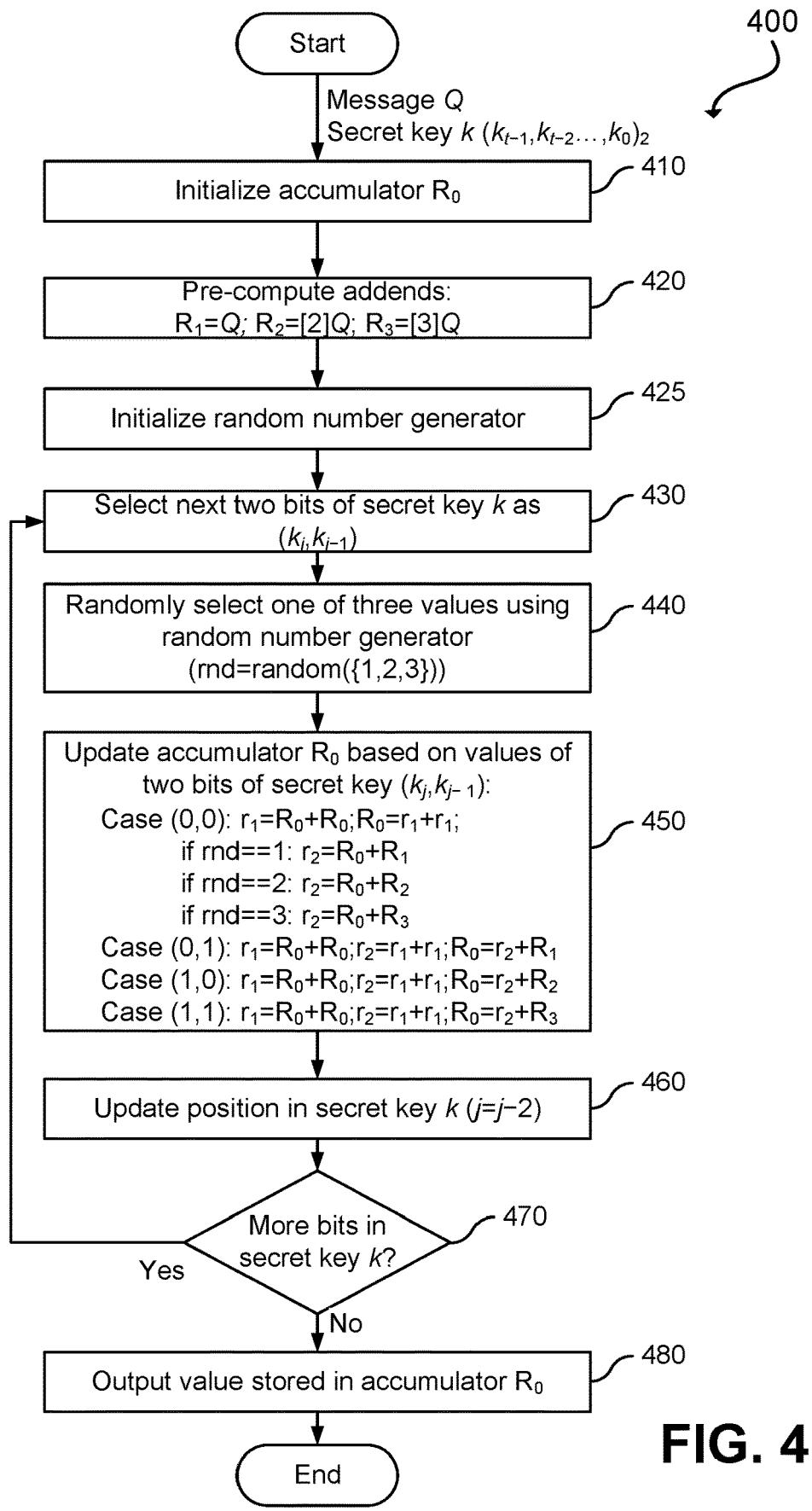
FIG. 4 is a flowchart of a method for computing a scalar multiplication, two bits of a multiplier (or multiplicand) at a time, according to one embodiment of the present disclosure.

FIG. 4 is a flowchart of a method 400 for computing a scalar multiplication, two bits of a multiplier (or multiplicand) at a time, according to one embodiment of the present disclosure. As noted above, elliptic-curve cryptography (ECC) is one example that uses scalar multiplication to perform cryptographic operations (encryption and decryption operations).

In a manner similar to that described above for modular exponentiation of a message g to the power of a secret key k performed two bits of the secret key k at a time, FIG. 4 depicts a method for scalar multiplication of a message Q by a secret key k performed two bits of the secret key k at a time. The arithmetic operations performed by the processing circuit 110 and described herein will be assumed to be arithmetic operations performed in a finite field as defined by an elliptic curve. Scalar multiplication as used herein is the operation of successive additions of a point along an elliptic curve to itself. Let Q be the point along elliptic curve, then successively adding Q to itself k times results in scalar product y. It is compactly referred to y=k·Q or y=[k]Q. The additions (double or add) are performed by the processing circuit 110 and assumed to be performed in a finite field defined by an elliptic curve.

At 410, the processing circuit 110 initializes an accumulator $R_0$. The accumulator $R_0$ may be stored, for example, in a register of the processing circuit 110. The accumulator $R_0$ stores a current accumulated result and will hold the desired output value y (representing the scalar multiplication product of message Q and secret key k) at the end of the scalar multiplication operation. In some embodiments, the accumulator is initialized to a value of 1.

At 420, the processing circuit 110 pre-computes addends that will be used during the remaining portion of the computation of the scalar multiplication. These pre-computed addends include: $R_1$ which stores the value Q, $R_2$ which stores the value [2]Q (Q+Q) and $R_3$ which stores the value [3]Q (Q+[2]Q). As noted above, these values are computed using modular arithmetic.

In some embodiments of the present disclosure, instead of initializing the accumulator $R_0$ to a value of 1 at 210, the accumulator $R_0$ is initialized based on the value of the two most significant bits (MSBs) of the secret key k. In a case where the first two bits are (0,0), then the processing circuit initializes the accumulator $R_0$ to a value of 1. In a case where the first two bits are (0,1), then the processing circuit initializes the accumulator $R_0$ to a value of Q (e.g., the value stored in $R_1$). In a case where the first two bits are (1,0), then the processing circuit initializes the accumulator $R_0$ to a value of [2]Q (e.g., the value stored in $R_2$). In a case where the first two bits are (1,1), then the processing circuit initializes the accumulator $R_0$ to a value of [3]Q (e.g., the value stored in $R_3$).

At 425, the processing circuit 110 initializes a random number generator or entropy generator (e.g., a deterministic random number generator DRNG or pseudorandom number generator PRNG). In a manner similar to that described above, if protection against differential attacks is enabled, then the processing circuit 110 initializes the random number generator based on a seed value computed based on the secret key k. Otherwise, the processing circuit may initialize the random number generator using a random value (e.g., set using another source of entropy, such as a hardware random number generator that uses characteristics such as noise measured from a physical sensor), based on a fixed value, or based on other values (e.g., based on a current timestamp).

At 430, the processing circuit 110 selects the next two bits of the secret key k. An index variable j may be used to indicate a current position in the secret key. In a case where the accumulator $R_0$ is initialized to a value of 1 (e.g., initialized without considering the two most significant bits of the secret key k) then, in a first iteration, the processing circuit 110 initializes the index variable j to t−1 and selects the two most significant bits of the secret key k (($k_j$, $k_{j-1}$)=($k_{t-1}$, $k_{t-2}$)). In a case where the accumulator $R_0$ was initialized based on the value of the two MSBs of the secret key k, then the processing circuit 110 initializes the index variable j to t−3 and selects the third and fourth MSBs of the secret key k (($k_j$, $k_{j-1}$)=($k_{t-3}$, $k_{t-4}$)).

At 440, the processing circuit 110 uses the random number generator to select a random value from a set of three options (e.g., selecting randomly between the set of values {1, 2, 3}).

At 450, the processing circuit 110 updates the value of the accumulator based on the four different possible cases for a pair of bits ($k_j$, $k_{j-1}$). In particular, any two bits may take on four different values: (0,0), (0,1), (1,0), or (1,1). (These pairs of bits may also be interpreted as representing an integer—0, 1, 2, or 3, respectively.) In cases other than where the bits were (0,0), the processing circuit 110 multiplies (or scales) the value of the accumulator $R_0$ by four ($[4]R_0$) through repeated doubling and stores this value in a temporary variable ($r_1=R_0+R_0$; $r_2=r_1+r_1$;). In the case where the bits were (0,1), the accumulator $R_0$ is then updated with the value of the temporary variable added to $R_1$ ($R_0=r_2+R_1=[4]R_0+Q$), in the case where the bits were (1,0), the accumulator $R_0$ is updated with the value of the temporary variable added to $R_2$ ($R_0=r_2+R_2=4R_0+2Q$)), and in the case where the bits were (1,1), the accumulator is added to $R_3$ ($R_0=r_2+R_3=4R_0+3Q$)).

In the case where the bits were (0,0), then the accumulator is only scaled by four to be computed as $4R_0$(e.g., $r_1=R_0+R_0$; $R_0=r_1+r_1$;), and no further addition to a pre-computed addend is necessary (e.g., the accumulator could be added to 0, which is a non-operation). However, failing to perform a third addition or sum operation for the case of (0,0) could result in the leak of side channel information through power analysis or timing analysis. Specifically, if only two modular addition operations were performed in the case where the bits of the secret key were (0,0) whereas three modular addition operations were performed in the other three cases, then information about the value of the secret key k through the power consumption of the processing circuit 110 or because no additional time was spent performing the third addition operation.

Accordingly, in some embodiments in which protection against side channel attacks is enabled (e.g., protection against SPA or DPA), the processing circuit 110 performs a dummy addition operation of the accumulator value $R_0$ to a value and stores that value in a temporary variable. Because the power consumption associated with adding the three different multipliers ($R_1$, $R_2$, $R_3$) may be different, the processing circuit 110 uses the random value (rnd) to select between the three possibilities.

As noted above, when protection against DPA is turned on, the random number generator is initialized or seeded based on a seed value that is computed from the secret key k. Accordingly, the processing circuit 110 will generate the same sequence of random values (rnd) across different cryptographic operations, such that the same pre-computed addends are chosen for the dummy addition operation each time. In a situation where protection against DPA was not turned on and different seed values were used to initialize the random number generator during different encoding processes, then an attacker could detect which parts of the secret key k had values (0,0) using differential power analysis by detecting the points at which the power consumption differed between runs (e.g., due to different pre-computed addends having different levels of power consumption being used for the dummy addition operation).

At 460, the processing circuit 110 updates the index variable j to proceed with the next two bits of the secret key k, such as by decrementing the index variable j by two (e.g., j=j−2).

At 470, the processing circuit 110 determines if there are more bits remaining in secret key k. For example, in some embodiments, the processing circuit 110 makes this determination based on whether the index variable j is non-negative (j≥0). If there are more bits to be processed, than the processing circuit 110 proceeds with selecting the next two bits of the secret key k ($(k_j, k_{j-1})$) at 430 based on the current value of the index variable j. If there are no additional bits, then at 480 the processing circuit 110 outputs the value stored in the accumulator $R_0$ as the result of the modular scalar multiplication of the input message Q by the secret key k ([k]Q).

Table 4, below, depicts a method for performing scalar multiplication, two bits of the secret key at a time, and explicitly showing the use of the SPA_flag and DPA_flag according to one embodiment of the present disclosure.

TABLE 4

```
Input: Q, k = (k_{t-1}, ... , k_0)_2
Output: y = [k]Q
R_0 = 1; R_1 = Q; R_2 = [2]Q; R_3 = [3]Q  → Precomputations
if (k_{t-1}, k_{t-2} = 0,0) then R_0 = R_0
if (k_{t-1}, k_{t-2} = 0,1) then R_0 = R_1
if (k_{t-1}, k_{t-2} = 1,0) then R_0 = R_2
if (k_{t-1}, k_{t-2} = 1,1) then R_0 = R_3
if (DPA_flag = 1) then
    entropy_gen.seed(f(k)) //Seed the entropy generator with a unique value dependent
on k to prevent DPA attacks
else
    entropy_gen.seed( ) // Seeding the entropy generator not required
for j = t - 3 downto 0 do
    RAND = entropy_gen.get( )     //RAND = {1,2,3}
    i = int(k_j, k_{j-1})_2
    if (k_j = 0) then
        if (RAND = 1) then
            r_1 = R_0 + R_0; R_0 = r_1 + r_1;
            If (SPA_flag = 1 or DPA_flag = 1) then
                r_2 = R_0 + R_1
        if (RAND = 2) then
            r_1 = R_0 + R_0; R_0 = r_1 + r_1;
            If (SPA_flag = 1 or DPA_flag = 1) then
                r_2 = R_0 + R_2
        if (RAND = 3) then
            r_1 = R_0 + R_0; R_0 = r_1 + r_1;
            If (SPA_flag = 1 or DPA_flag = 1) then
                r_2 = R_0 + R_3
    if (k_j = 1) then r_1 = R_0 * R_0; r_2 = r_1 * r_1; R_0 = r_2 * R_1
    if (k_j = 2) then r_1 = R_0 * R_0; r_2 = r_1 * r_1; R_0 = r_2 * R_2
    if (k_j = 3) then r_1 = R_0 * R_0; r_2 = r_1 * r_1; R_0 = r_2 * R_3
    j = j - 2
return R_0
```

Scalar multiplication methods according to embodiments of the present disclosure are applicable to ECC Weierstrass curves, NIST curves, Brainpool curves, and other curves which follow a similar approach for use in performing cryptographic operations.

Figure 5:
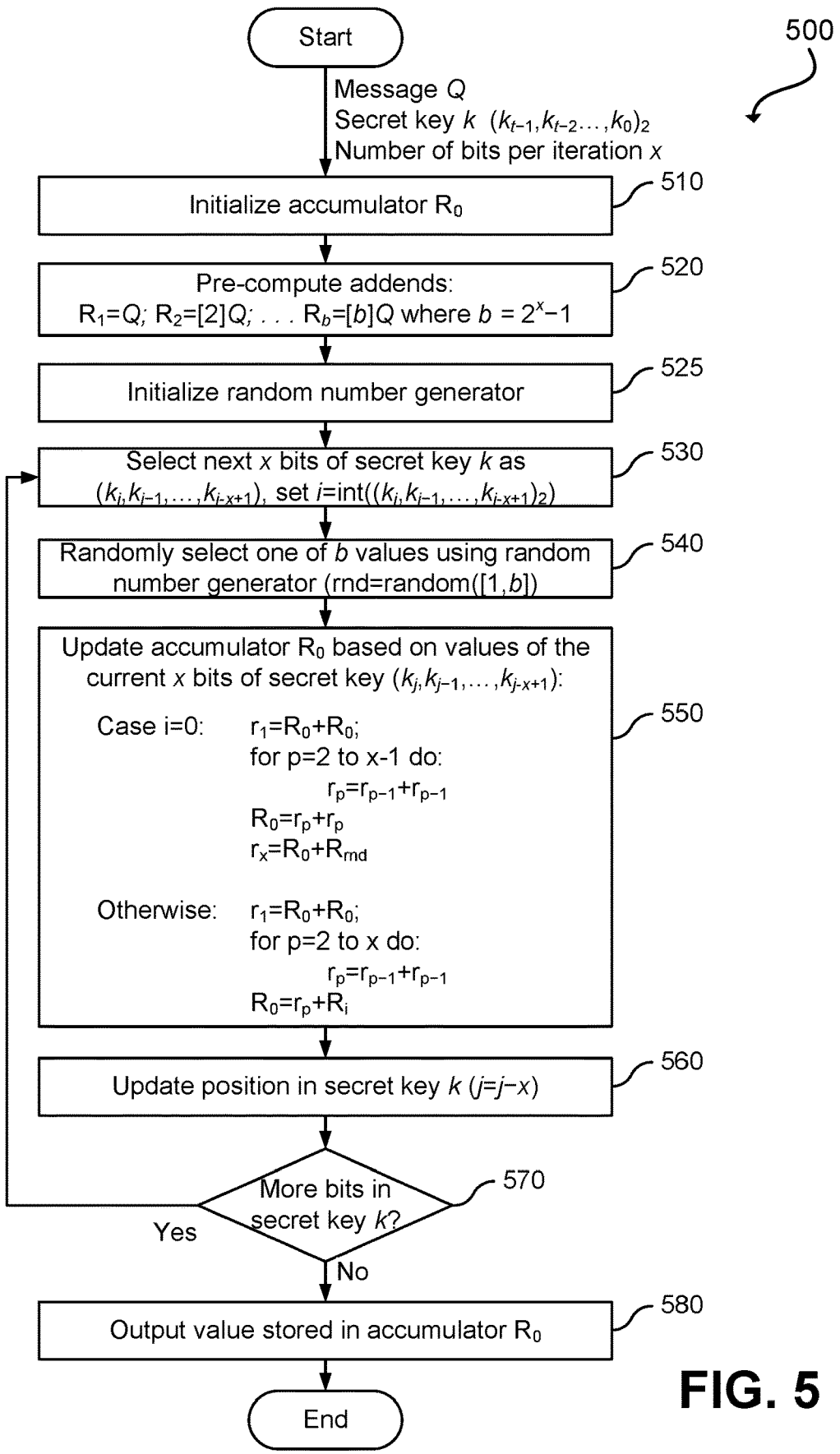
FIG. 5 is a flowchart of a method for computing a scalar multiplication, x bits of a multiplier (or multiplicand) at a time, according to one embodiment of the present disclosure.

FIG. 5 is a flowchart of a method 500 for computing a scalar multiplication, x bits of a multiplier (or multiplicand) at a time, according to one embodiment of the present disclosure. The method of FIG. 5 is similar to the method shown in FIG. 3 for modular exponentiation, x bits at a time, but with the modular multiplications replaced with modular additions such that the method performs scalar multiplication.

At 510, the processing circuit 110 initializes an accumulator $R_0$. The accumulator $R_0$ may be stored, for example, in a register of the processing circuit 110. The accumulator $R_0$ stores a current accumulated result and will hold the desired output value y at the end of the scalar multiplication operation (y=[k]Q). In some embodiments, the accumulator is initialized to a value of 1.

At 520, the processing circuit 110 pre-computes addends that will be used during the remaining portion of the computation of the scalar product of message Q and secret key k. In particular, b different addends are initialized, $R_1$ through $R_b$, where $b=2^x-1$, and where $R_1=[i]Q$. As noted above, these values are computed using modular arithmetic, where $R_i=[i]Q$ in this context means $R_1=[i]Q$ mod n. The number of pre-computed multipliers b grows exponentially with respect to the number of bits x that are processed during each iteration, therefore resulting in a tradeoff between memory and computational acceleration based on the configuration parameter of the number of bits x.

In some embodiments of the present disclosure, instead of initializing the accumulator $R_0$ to a value of 1 at 510, the accumulator $R_0$ is initialized based on the value of the x most significant bits (MSBs) of the secret key k ($k_{t-1}, \ldots, k_{t-x}$).

In more detail, interpreting the first x bits of the secret key k as an integer w, then $R_0$ is initialized to $R_w$ from among the b pre-computed multipliers $R_1$ through $R_b$.

At 525, the processing circuit 110 initializes a random number generator or entropy generator (e.g., a deterministic random number generator DRNG or pseudorandom number generator PRNG). In a manner similar to that described above, if protection against differential attacks is enabled, then the processing circuit 110 initializes the random number generator based on a seed value computed based on the secret key k. Otherwise, the processing circuit may initialize the random number generator using a random value (e.g., set using another source of entropy, such as a hardware random number generator that uses characteristics such as noise measured from a physical sensor), based on a fixed value, or based on other values (e.g., based on a current timestamp).

At 530, the processing circuit 110 selects the next x bits of the secret key k. As above, an index variable j may be used to indicate a current position in the secret key. In a case where the accumulator $R_0$ is initialized to a value of 1 (e.g., initialized without considering the two most significant bits of the secret key k) then, in a first iteration, the processing circuit 110 initializes the index variable j to t−1 and selects the x most significant bits of the secret key k (e.g., $(k_j, k_{j-1}, \ldots, k_{j-x+1}) = (k_{t-1}, k_{t-2}, \ldots, k_{t-x})$). In a case where the accumulator $R_0$ was initialized based on the value of the x MSBs of the secret key k, then the processing circuit 110 initializes the index variable j to t−x and selects the next x MSBs of the secret key k (e.g., $(k_j, k_{j-1}, \ldots, k_{t-x+1}) = (k_{t-x-1}, k_{t-x-1}, \ldots, k_{t-2x})$).

At 540, the processing circuit 110 uses the random number generator to select a random value (rnd) from a set of b options (e.g., selecting randomly between the set values 1 through b).

At 550, the processing circuit 110 based on the number of bits in the sequence or bitstring of x selected bits $(k_j, k_{j-1}, \ldots, k_{j-x+1})$ and the value of the bits in the bitstring. The current bitstring of x bits can be interpreted as an integer $i = \text{int}((k_j, k_{j-1}, \ldots, k_{j-x+1})_2)$.

In a case where $i \neq 0$ (corresponding to a case where at least one of the x bits is non-zero), the processing circuit 110 initializes a temporary variable $r_1$ to the double of the current value of the accumulator $R_0 (r_1 = R_0 + R_0)$ and then iterates from 2 to x using an index variable p, where at each iteration, the processing circuit 110 doubles the previous value $r_p = r_{p-1} + r_{p-1}$. After computing $r_x$, the processing circuit 110 After computing $r_x$, the processing circuit 110 has computed a value in the accumulator $R_0$ that depends on the number of bits in the bitstring of x selected bits (e.g., that depends only on the number x), and then further computes the updated value of the accumulator $R_0$ based on $r_x$ and a pre-computed addend as selected based on the integer representation i of the x bit bitstring: $R_0 = r_x + R_t$.

In a case where $i = 0$ (corresponding to a case where all x bits are 0), the processing circuit 110 initializes a temporary variable $r_1$ to double the current value of the accumulator $R_0$ $(r_1 = R_0 + R_0)$ and then iterates from 2 to x−1 using an index variable p, where at each iteration, the processing circuit 110 computes the double of the previous value: $r_p = r_{p-1} + r_{p-1}$. After computing $r_{x-1}$, the processing circuit 110 computes the updated value of the accumulator $R_0$ based on $r_{x-1}$ as $R_0 = r_{x-1} + r_{x-1}$. Accordingly, in the case where $i = 0$, the processing circuit 110 computes the updated value of the accumulator $R_0$ based only on the number x of selected bits.

However, in a manner similar to that described above with respect to FIG. 3, in the case of $i = 0$, there is one fewer addition operation performed than in the case where $i \neq 0$ (e.g., in the case of $i = 0$, the iteration is performed from 2 to x−1 versus from 2 to x in the case of $i \neq 0$). As such, in some embodiments, the processing circuit 110 performs a dummy addition operation where a temporary or dummy variable $r_x$ is assigned the value of $R_0$ added to a randomly selected pre-computed multiplier $R_{rnd}$ (where the value of rnd was set at 340 using the random number generator was used to select a random value from 1 to b).

At 560, the processing circuit 110 updates the index variable j to proceed with the next x bits of the secret key k, such as by decrementing the index variable j by x (e.g., j=j−x).

At 570, the processing circuit 110 determines if there are more bits remaining in secret key k. For example, in some embodiments, the processing circuit 110 makes this determination based on whether the index variable j is non-negative ($j \geq 0$). If there are more bits to be processed, than the processing circuit 110 proceeds with selecting the next x bits of the secret key k $((k_j, k_{j-1}, \ldots, k_{j-x+1}))$ at 530 based on the current value of the index variable j. If there are no additional bits, then at 580 the processing circuit 110 outputs the value stored in the accumulator $R_0$ as the result of the scalar multiplication of the input message Q by the secret key k (k·Q).

Throughput performance of the technique according to embodiments of the present disclosure may be increased by increasing the number of bits x that are considered during each iteration, which also increases the number of pre-computations that are performed and which also increases the storage (memory) consumed to store these pre-computations (e.g., pre-computed multipliers in the case of modular exponentiation and pre-computed addends in the case of scalar multiplication).

The memory usage may be referred to herein as a number of memory registers because, in some embodiments, the pre-computed values are stored in registers of the processing circuit 110 (e.g., internal to a processor core), thereby avoiding performance penalties associated with the high latency associated with fetching values across a bus from a cache or external memory. A processing circuit 110 designed to implement embodiments of the present disclosure may include a number of hardware registers in accordance with the number of pre-computed values (pre-computed multipliers or pre-computed addends) based on the number of bits x that are processed during each iteration. For example, a processing circuit 110 (or processor) designed to operate on at least x key-bits in each iteration may have at least $b = 2^x - 1$ registers for storing corresponding ones of the b pre-computed values. In some embodiments, the processing circuit 110 (or processor) may further include a register for storing the accumulator value (e.g., $R_0$) and therefore have at least $2^x$ registers. In other words, the processing circuit 110 (or processor) that is configured to operate on at least x key-bits of a secret key during each iteration of a modular exponentiation or scalar multiplication may have a number of registers that is greater than or equal to $2^x$. These registers may be used to store the accumulator ($R_0$) and the $b = 2^x - 1$ values that are pre-computed based on an input message (e.g., referred to above as input message g in the case of modular exponentiation or as input message Q in the case of scalar multiplication).

Accordingly, aspects of embodiments of the present disclosure relate to performing cryptographic computations, such as modular exponentiation and scalar multiplication, in a high-throughput manner that is resilient against side-channel attacks, including simple and differential side-channel attacks. Embodiments of the present disclosure may operate with protection against only simple side-channel attacks (e.g., simple power analysis, timing analysis, and simple electromagnetic analysis), protection against differential side-channel attacks (e.g., differential power analysis, differential timing analysis, and differential electromagnetic analysis), or without protection against side-channel attacks (e.g., throughput acceleration only). Furthermore, methods according to embodiments of the present disclosure have adjustable throughput improvement with a tradeoff of increased memory usage (e.g., register usage), such that the technique may be adapted based on the hardware capabilities of a processing circuit implementing embodiments of the present disclosure.

Figure 6:
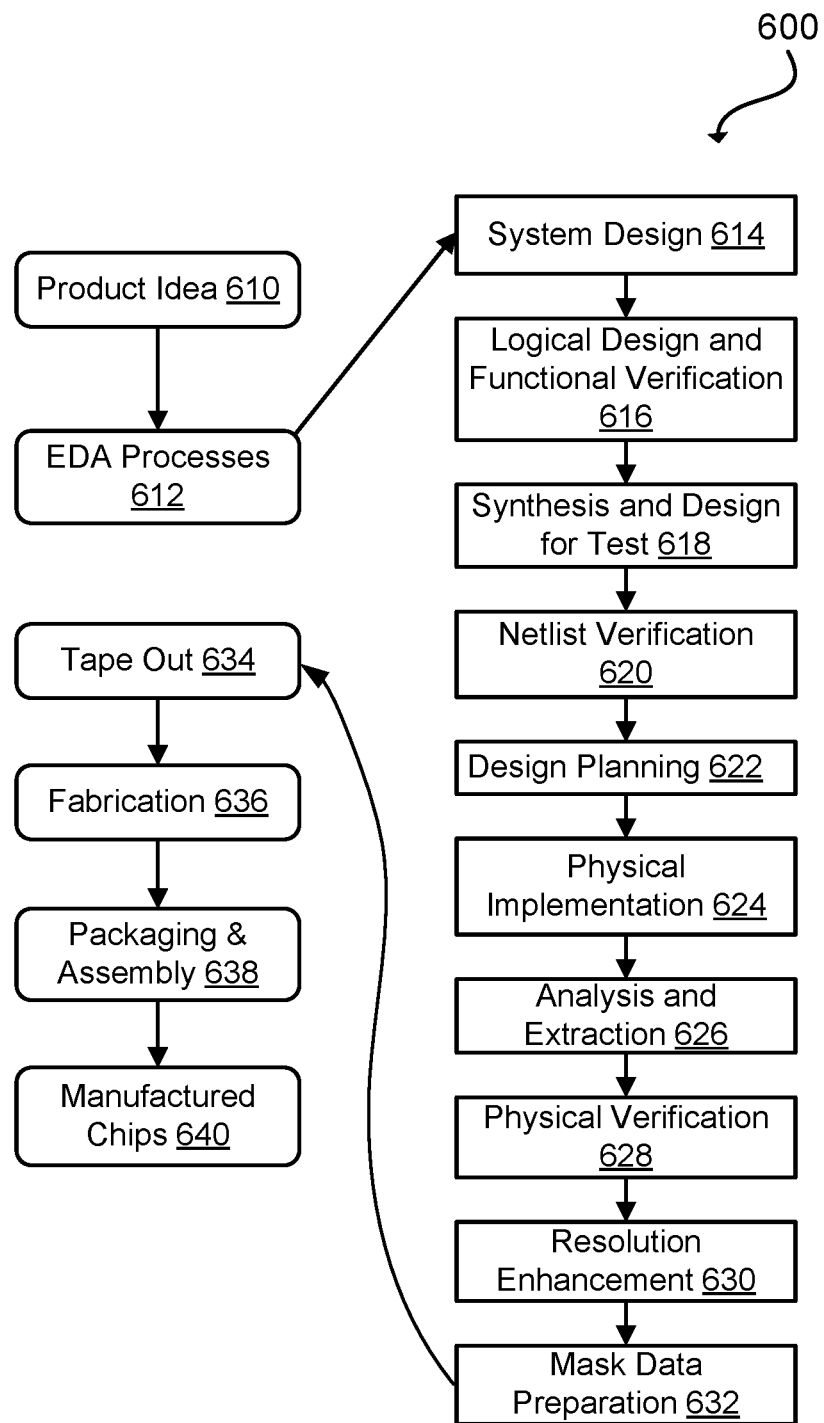
FIG. 6 depicts a flowchart of various processes used during the design and manufacture of an integrated circuit in accordance with some embodiments of the present disclosure.

FIG. 6 illustrates an example set of processes 600 used during the design, verification, and fabrication of an article of manufacture such as an integrated circuit to transform and verify design data and instructions that represent the integrated circuit.

Each of these processes can be structured and enabled as multiple modules or operations. The term 'EDA' signifies the term 'Electronic Design Automation.' These processes start with the creation of a product idea 610 with information supplied by a designer, information which is transformed to create an article of manufacture that uses a set of EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly processes 638 are performed to produce the finished integrated circuit 640.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 6. The processes described by FIG. 6 may be enabled by EDA products (or EDA systems).

Such a design process may be used to generate, for example, a processing circuit configured to perform cryptographic operations in accordance with embodiments of the present disclosure. Such a processing circuit may include, for example, a cryptographic accelerator or cryptoprocessor (e.g., a hardware security module or a trusted platform module). In addition, in some embodiments of the present disclosure, a processing circuit in accordance with embodiments of the present disclosure may be integrated as a sub-circuit of an integrated circuit such as a system on chip (SoC), an application processor (AP), a network interface controller (NIC), or the like. In some such circumstances, a design for a processing circuit in accordance with embodiments of the present disclosure (e.g., a design for a processing circuit implementing modular exponentiation and/or scalar multiplication operations in accordance with embodiments of the present disclosure) may be provided as computer instructions that can be included in such a larger design (referred to as IP). The computer instructions representing the design of a processing circuit according to embodiments of the present disclosure may be stored in a non-transitory computer-readable medium or storage medium such that, when the instructions are executed, cause the computer to produce a representation of the design, where the digital design may then be fabricated, as described in more detail below.

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 700 of FIG. 7) may be used to store the programs and data structures that are used by some or all of the EDA products described herein, and products used for development of cells for the library and for physical and logical design that use the library.

Figure 7:
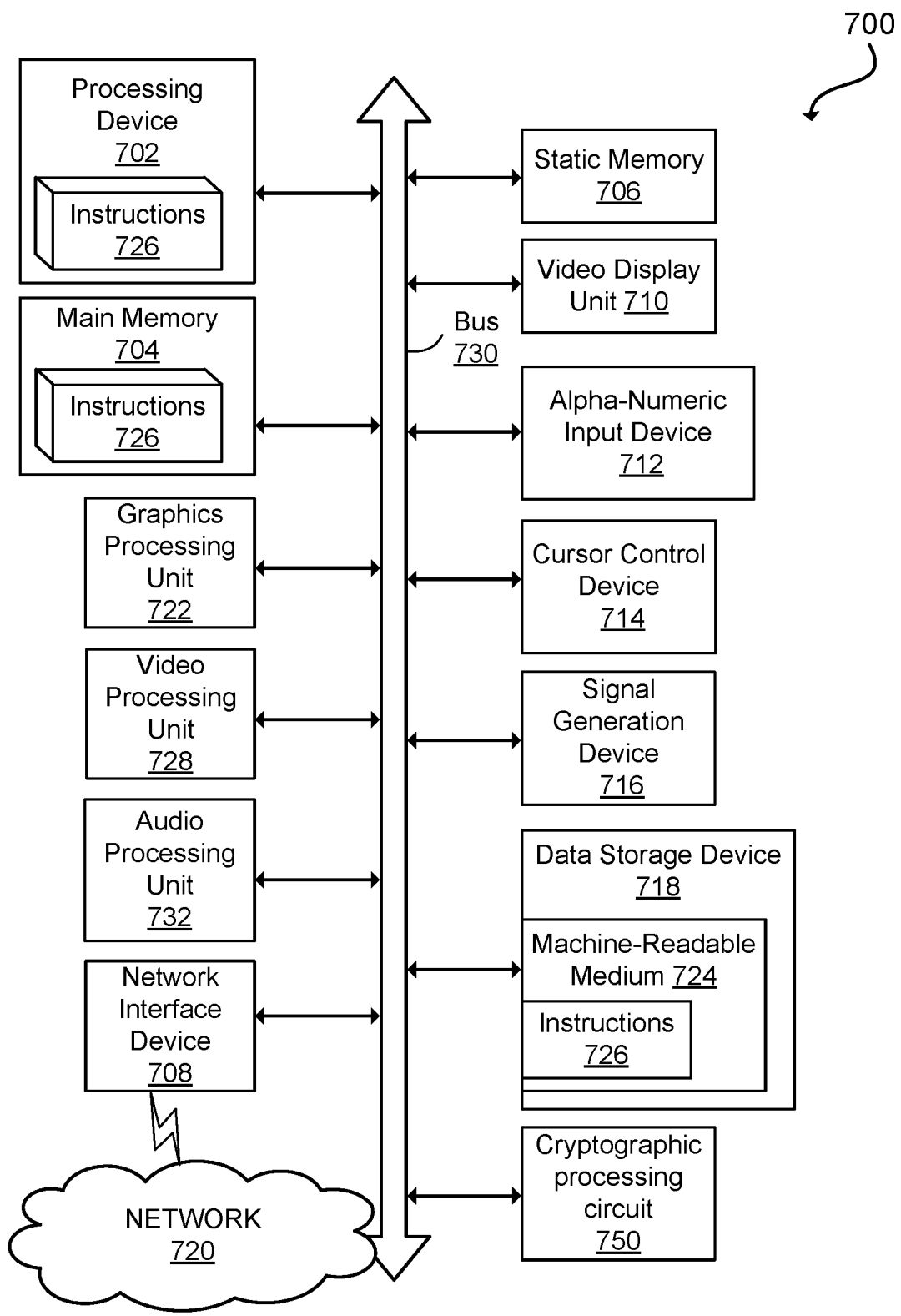
FIG. 7 depicts a diagram of an example computer system in which embodiments of the present disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random-access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

As shown in FIG. 7, the computer system 700 may further include a cryptographic processing circuit 750 (or cryptographic processor) configured to perform operations in accordance with embodiments of the present disclosure as described above with respect to FIGS. 2, 3, 4, 5, and 6.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
receiving an input message;
computing values based on the input message;
initializing an accumulator value;
iterating, by a processor, through bits of a secret key, each iteration comprising:
selecting a specified number of next most significant bits (MSBs) of the secret key as a bitstring of selected bits;
selecting, randomly, one of the values computed from the input message;
in a case where all bits of the bitstring of selected bits of the secret key have values of zero:
updating the accumulator value based on the specified number of the next MSBs; and
performing a dummy operation based on the accumulator value and the randomly selected one of the values computed from the input message; and
generating an output message based on a value stored in the accumulator value after iterating through the bits of the secret key.

2. The method of claim 1, wherein the values computed from the input message comprise $b=2^x-1$ values, where x is the specified number of next MSBs.

3. The method of claim 2, wherein the output message is a modular exponentiation of the input message raised to the power of the secret key,
wherein the values computed from the input message correspond to the input message raised to successive integer powers from 1 to b;
wherein the updating the accumulator value based on the specified number of next MSBs comprises performing a plurality of modular multiplication operations, and
wherein the dummy operation is a dummy modular multiplication operation.

4. The method of claim 2, wherein the output message is a scalar multiplication product of the input message and the secret key,
wherein the values computed from the input message correspond to the input message multiplied by successive integer values from 1 to b;
wherein the updating the accumulator value based on the specified number of next MSBs comprises performing a plurality of addition operations, and
wherein the dummy operation is a dummy addition operation.

5. The method of claim 4, wherein the scalar multiplication product and the plurality of addition operations are performed in a finite field defined by an elliptic curve.

6. The method of claim 1, wherein the selecting, randomly, the one of the values computed from the input message is performed using a random number generator, the random number generator being initialized using a seed value computed based on the secret key.

7. The method of claim 1, wherein the values computed from the input message are stored in corresponding ones of a plurality of registers of the processor.

8. A system comprising:
a memory storing instructions;
a processor; and
a cryptographic processing circuit configured to:
receive an input message from the memory;
store values pre-computed based on the input message in corresponding ones of a plurality of registers of the cryptographic processing circuit;
initialize an accumulator value;
iterate through bits of a secret key stored in a secure memory, a specified number of bits of the secret key per iteration, each iteration comprising:
selecting the specified number of next most significant bits (MSBs) of the secret key as a bitstring of selected bits;
selecting, randomly, one of the pre-computed values;
in a case where all bits of the bitstring of selected bits of the secret key have values of zero:
updating the accumulator value based on the specified number; and
performing a dummy operation based on the accumulator value and the randomly selected one of the pre-computed values; and
in a case where at least one bit of the bitstring of selected bits of the secret key has a value of one, updating the accumulator value based on the specified number and based on one of the pre-computed values selected based on the bitstring of selected bits of the secret key; and
generate an output message based on a value stored in the accumulator value after iterating through the bits of the secret key.

9. The system of claim 8, wherein the pre-computed values comprise $b=2^x-1$ pre-computed values, where x is the specified number of next MSBs.

10. The system of claim 9, wherein the output message is a modular exponentiation of the input message raised to the power of the secret key,
wherein the pre-computed values correspond to the input message raised to successive integer powers from 1 to b;
wherein the updating the accumulator value based on the specified number of next MSBs comprises performing a plurality of modular multiplication operations, and wherein the dummy operation is a dummy modular multiplication operation.

11. The system of claim 9, wherein the output message is a scalar multiplication product of the input message and the secret key,
wherein the pre-computed values correspond to the input message multiplied by successive integer values from 1 to b;
wherein the updating the accumulator value based on the specified number of next MSBs comprises performing a plurality of addition operations, and
wherein the dummy operation is a dummy addition operation.

12. The system of claim 11, wherein the scalar multiplication product and the plurality of addition operations are performed in a finite field defined by an elliptic curve.

13. The system of claim 8, wherein the cryptographic processing circuit is further configured to:
receive an input setting a differential power analysis protection flag, and in response to receiving the input setting activating the differential power analysis protection flag, selecting, randomly, the one of the pre-computed values is performed using a random number generator, the random number generator being initialized using a seed value computed based on the secret key.

14. A non-transitory computer-readable medium comprising stored instructions, which when executed by a processor, cause the processor to generate a digital representation of an integrated circuit comprising:
a processing circuit comprising a plurality of registers, the processing circuit being configured to:
receive an input message;
store values pre-computed based on the input message in corresponding ones of the plurality of registers of the processing circuit;
initialize an accumulator value;
iterate through bits of a secret key, a specified number of bits of the secret key per iteration, each iteration comprising:
selecting the specified number of next most significant bits (MSBs) of the secret key as a bitstring of selected bits;
selecting, randomly, one of the pre-computed values;
in a case where all bits of the bitstring of selected bits of the secret key have values of zero:
updating the accumulator value based on the specified number; and
performing a dummy operation based on the accumulator value and the randomly selected one of the pre-computed values; and
in a case where at least one bit of the bitstring of selected bits of the secret key has a value of one,
updating the accumulator value based on the specified number and based on one of the pre-computed values selected based on the bitstring of selected bits of the secret key; and
generate an output message based on a value stored in the accumulator value after iterating through the bits of the secret key.

15. The non-transitory computer-readable medium of claim 14, wherein the pre-computed values comprise $b=2^x-1$ pre-computed values, where x is the specified number of next MSBs.

16. The non-transitory computer-readable medium of claim 15, wherein the output message is a modular exponentiation of the input message raised to the power of the secret key,
wherein the pre-computed values correspond to the input message raised to successive integer powers from 1 to b;
wherein the updating the accumulator value based on the specified number of next MSBs comprises performing a plurality of modular multiplication operations, and
wherein the dummy operation is a dummy modular multiplication operation.

17. The non-transitory computer-readable medium of claim 15, wherein the output message is a scalar multiplication product of the input message and the secret key,
wherein the pre-computed values correspond to the input message multiplied by successive integer values from 1 to b;
wherein the updating the accumulator value based on the specified number of next MSBs comprises performing a plurality of addition operations, and
wherein the dummy operation is a dummy addition operation.

18. The non-transitory computer-readable medium of claim 14, wherein the processing circuit is further configured to:
receive an input setting a differential power analysis protection flag, and in response to receiving the input setting activating the differential power analysis protection flag, selecting, randomly, the one of the pre-computed values is performed using a random number generator, the random number generator initialized using a seed value computed based on the secret key.

19. The non-transitory computer-readable medium of claim 14, wherein the digital representation of the integrated circuit further comprises a secure memory configured to store the secret key.

20. The non-transitory computer-readable medium of claim 14, wherein the digital representation of the integrated circuit comprises a system-on-chip comprising the processing circuit.

* * * * *